United States Patent [19]

Reighard et al.

[11] 3,827,603

[45] Aug. 6, 1974

[54] THERMOPLASTIC APPLICATOR SYSTEM IN WHICH THE PUMP BACK-PRESSURE CONTROLS THE DISPENSING OUTLET

[75] Inventors: Alan B. Reighard, Bay Village; Samuel R. Rosen, Lorain; Ronald R. Schroeder, Amherst; Simon Z. Tamny, Lorain, all of Ohio

[73] Assignee: Nordson Corporation, Amherst, Ohio

[22] Filed: June 1, 1972

[21] Appl. No.: 258,891

[52] U.S. Cl. .......... 222/146 HE, 222/385, 222/334, 222/504
[51] Int. Cl. .............................................. B67d 5/60
[58] Field of Search ........ 222/146 R, 146 HE, 383, 222/380, 55, 61, 334, 335, 504, 309, 52, 385; 118/411, 410, 315, 2

[56] References Cited
UNITED STATES PATENTS

| | | | |
|---|---|---|---|
| 3,094,938 | 6/1963 | Blomeke et al. | 222/383 X |
| 3,104,986 | 9/1963 | Goman et al. | 118/410 X |
| 3,224,411 | 12/1965 | Blaha et al. | 118/411 X |
| 3,521,789 | 7/1970 | Kraft | 222/334 X |
| 3,662,927 | 5/1972 | Cocks | 222/309 X |

Primary Examiner—Stanley H. Tollberg
Assistant Examiner—James M. Slattery
Attorney, Agent, or Firm—Wood, Herron & Evans

[57] ABSTRACT

An applicator system for melting thermoplastic material and supplying the molten or liquid material under pressure and at a controlled temperature to an applicator head or gun. The material is heated in a reservoir from which it is pumped to the applicator gun by a single-acting, sleeve-type piston pump. The pump is driven by a single-acting reciprocating air motor. There is an interlock valve associated with the air motor for controlling opening and closing of a valve of the gun. This interlock valve insures that the gun valve is never opened and molten material is never dispersed from the gun except when the molten material pressure is at a predetermined operating level.

30 Claims, 5 Drawing Figures

PATENTED AUG 6 1974        3,827,603

THERMOPLASTIC APPLICATOR SYSTEM IN WHICH THE PUMP BACK-PRESSURE CONTROLS THE DISPENSING OUTLET

This invention relates to the dispensing of thermoplastic material and particularly to the dispensing of materials of the so-called "hot melt" adhesive type. More particularly, the invention relates to dispensing systems in which solid thermoplastic material is melted and then pumped in a molten state to an applicator head or gun.

Thermoplastic adhesives, or so-called "hot melt" adhesives are now commonplace and are used for bonding numerous diverse materials. Primarily, however, hot melts are used for sealing packages where the high speed setting time of the hot melt material may be used to advantage. The applicator system of this invention is primarily intended for application of the thermoplastic materials to packages but it is also applicable to other types of applications, as for example, the application of hot melt materials in the assembly of automobiles, electronics, electrical equipment, appliances, electrical components, furniture, aircraft subassemblies, and metal-to-metal bonds.

While "hot melt" applications are now commonplace, their use has in some instances been restricted by the lack of a relatively inexpensive applicator system. At the present time the systems which are available for the application of "hot melts" are quite expensive and consequently some potential uses are discouraged by the relatively high equipment investment required for a hot melt installation.

Still another factor which has inhibited the use of hot melt adhesives has been the lack of a relatively maintenance-free applicator system. Most systems now available utilize complex pumping systems which include numerous check valves as well as complex motor structures for driving these pumps. These complex pumps and driving motors are subject to failure because of a large number of parts being subject to becoming clogged and/or broken.

It has therefore been a primary objective of this invention to provide a relatively inexpensive and trouble-free hot melt applicator system.

Another objective of this invention has been to provide a hot melt applicator system which is maintenance-free and which is not subject to excessive clogging, breakdown, and failure.

These objectives are accomplished and one aspect of this invention is predicated upon the use of a relatively inexpensive pneumatic motor and piston pump for supplying molten material to a dispenser gun. In the preferred embodiment, the pump is mounted in the reservoir and is driven from an independently mounted pneumatic motor. The piston and piston rod of the motor are so mounted in the motor cylinder that they are free for limited lateral movement and are therefore self-centering relative to the pump cylinder. This self-centering of the pump and motor minimizes the criticality of manufacturing tolerances and therefore substantially reduces the cost of manufacture of the system.

Another aspect of this invention is predicated upon the use of a simple sleeve type piston pump for supplying the molten material under pressure to the dispensing gun. The pump is single-acting and the sleeve is so ported that, upon each return stroke of the pump piston, a slug of molten material is drawn into the pump by a vacuum created interiorly of the sleeve. Subsequently, on the forward stroke of the pump piston, the slug of molten material is forced outwardly at a desired application pressure.

To minimize the equipment cost, the motor is a single acting air motor which utilizes a spring return. This structure minimizes the cost of the motor and the valving required to control actuation of the motor.

To prevent contamination of the motor cylinder area by gases evolved from the heated hot melt material, the spring chamber of the air motor is ported so that during each stroke of the motor piston, air at atmospheric pressure and ambient temperature is circulated through the spring chamber.

The applicator system of this invention also incorporates a unique interlock valve for preventing opening of a control valve of the dispenser gun except when the molten material is at a predetermined pressure. This interlock valve insures that the dispenser flow control valve is never opened during the return stroke of the piston pump or when the molten material is at less than a preset application pressure.

Briefly, the apparatus which accomplishes these objectives comprises a melting tank or reservoir for receiving solid thermoplastic material and melting that material to convert it to a molten state. Electrical heating elements are embedded in the bottom of the tank or reservoir for imparting heat to the bottom of the tank. There is a sleeve-type piston pump located in the reservoir for pumping molten material from the tank to a dispensing gun. The piston of the pump is driven by a single-acting pneumatic motor mounted upon the top of the reservoir. During each stroke of the pump piston, a slug of material is charged into the barrel so that during subsequent forward movement of the piston the slug is forced through the barrel into and through a hose to the dispensing gun.

In the preferred embodiment of the invention, there is an interlock valve mounted on the top of the air motor through which air from the pressure chamber of the pneumatic motor flows to the dispensing gun so as to effectuate opening of a control valve of the gun. This interlock valve, though, normally maintains the flow path to the dispensing gun blocked until such time as the pressure in the pneumatic chamber of the motor reaches a predetermined value, which value is only reached when the back pressure of the pump causes the pneumatic pressure to reach a preset value. Consequently, the interlock valve insures that the flow control valve of the gun is only opened when the molten material is at a preset application pressure.

The primary advantage of this dispensing system is the minimal cost at which it may be manufactured when compared to comparable systems now available. It also has the advantage of being relatively maintenance-free and free from mechanical failure, either because of the components of the system breaking or because of valves becoming clogged with dirt or debris.

These and other objects and advantages of this invention will be more readily apparent from the following description of the drawings in which.

Figure 1:
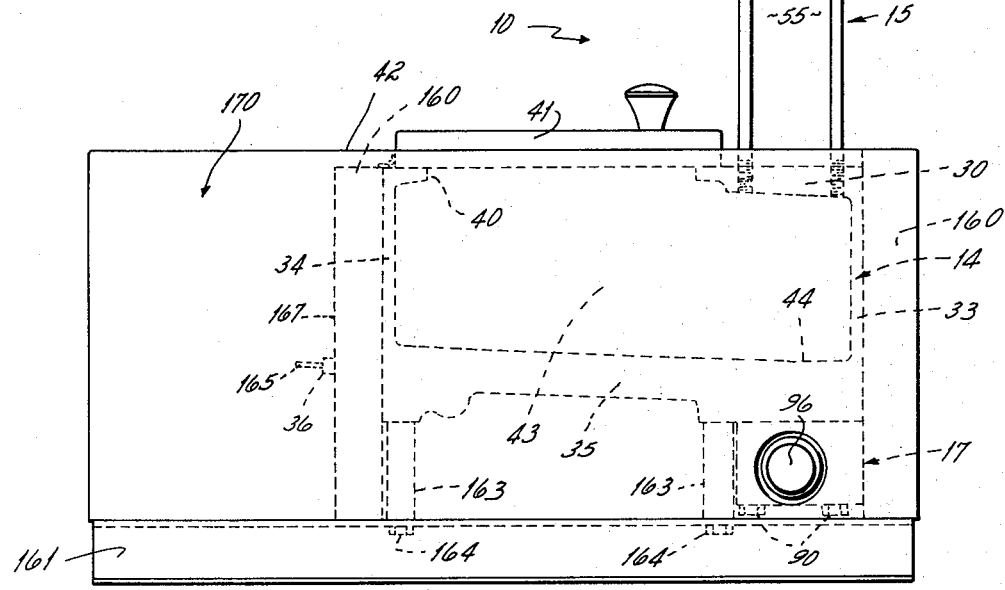
FIG. 1 is a side elevational view of a machine for supplying molten material to a dispensing gun.
Figure 2:
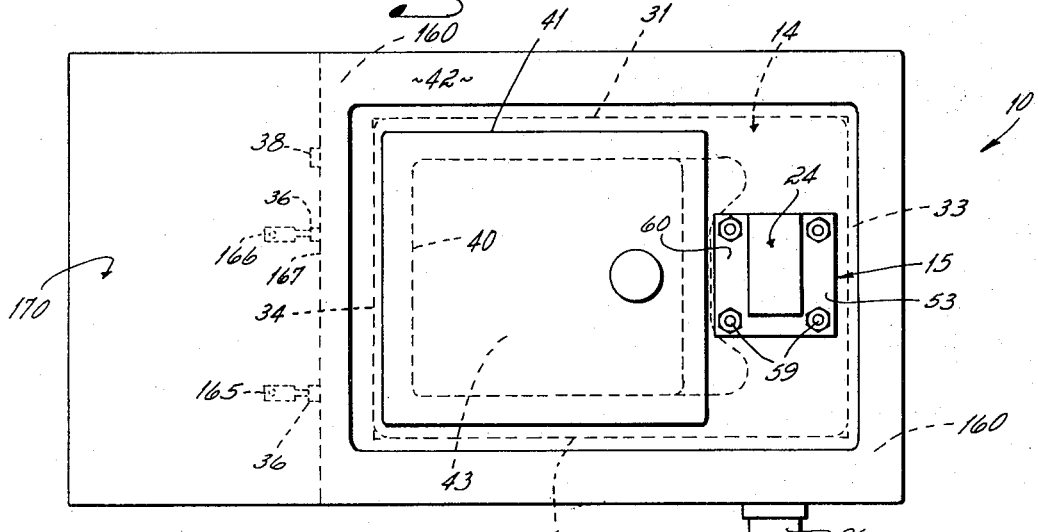
FIG. 2 is a top plan view of the machine of FIG. 1.
Figure 3:
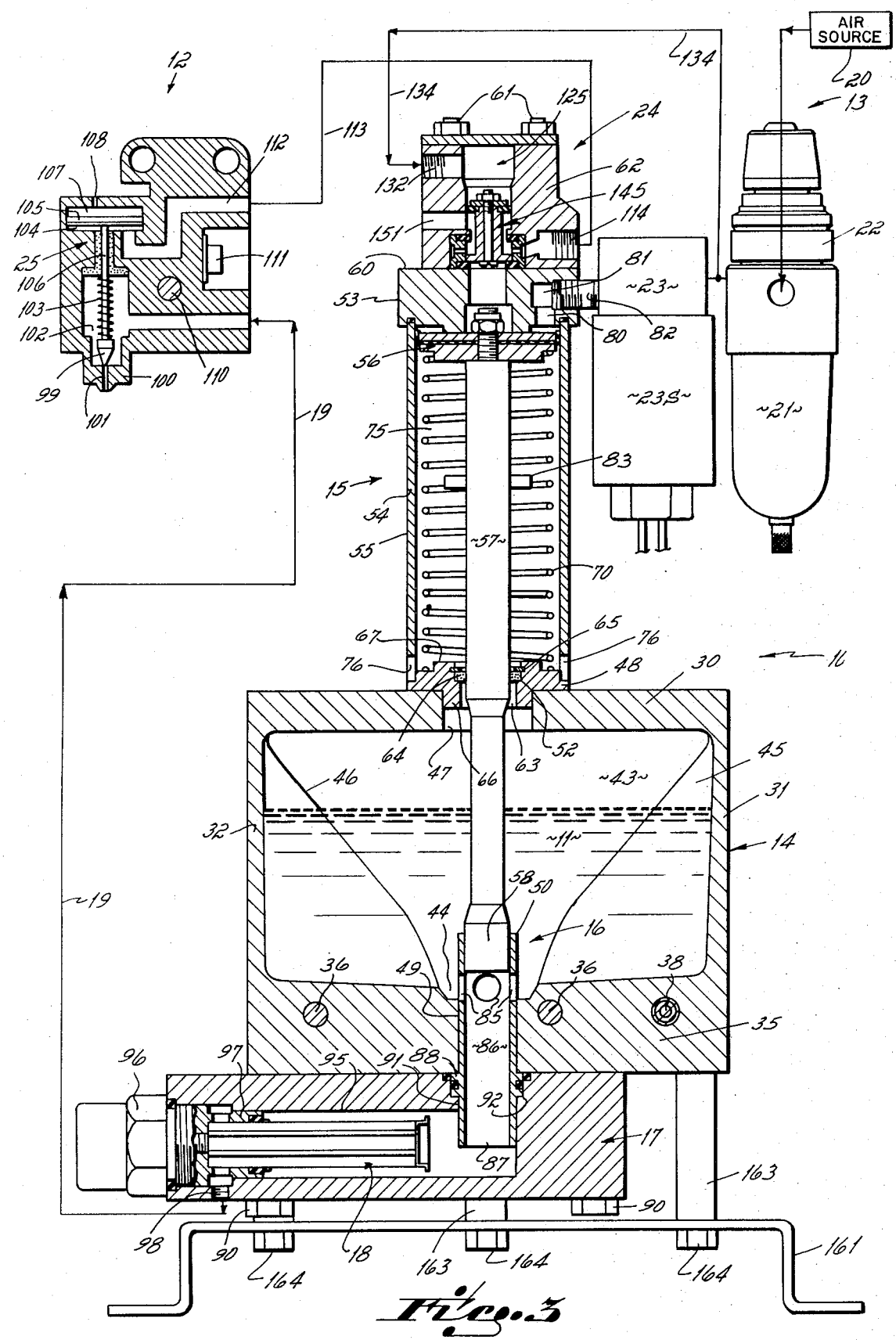
FIG. 3 is a cross sectional view taken on line 3—3 of FIG. 1 and additionally diagrammatically illustrating the dispenser gun to which the molten material is applied by the machine.

There is illustrated in FIGS. 1-3 of the drawings a complete dispensing system for receiving thermoplastic material in a solid form, converting the material to a molten state, and supplying the material under pressure to a dispensing gun. The system comprises a machine 10 for receiving the material in a solid state, melting it and applying it at a pressure of from 50-800 p.s.i. to a dispensing gun 12. Both the gun 12 and the machine 10 are pneumatically actuated and are interconnected by a pneumatic control system indicated generally by the numeral 13.

The machine 10 comprises a heated reservoir 14, a pneumatic motor 15, a pump 16, and a manifold block 17. A filter 18 is located in the manifold block 17 and is so positioned that material must pass through it before being transported through a hose 19 to the dispensing gun 12.

The pneumatic control system comprises a source of air pressure 20, an air filter 21, a pressure regulator 22, a three-way solenoid-operated valve 23, and a pilot-operated, differential pressure valve 24. As is explained more fully hereinafter, the valve 24 serves as an interlock between the pump driving pneumatic motor 15 and a pneumatic motor 25 of the dispensing gun 12.

RESERVOIR

The reservoir 14 is preferably made from heavy cast aluminum. It comprises a top wall 30, a pair of side walls 31 and 32, a pair of end walls 33 and 34, and a bottom wall 35. In the preferred embodiment there is a heating element 36 cast into the bottom wall 35 of the reservoir. There is also an electrical thermostat 38 embedded in the bottom wall 35 for controlling the temperature of the heater 36.

The top wall 30 of the reservoir 14 has a large opening 40 covered by a movable lid 41 of a housing 42. Solid thermoplastic material is inserted into the interior chamber 43 of the reservoir through this opening. The heaters 36 and 37 of the reservoir then cause the solid material to be melted and, while in the molten state, to flow toward the lower front end 44 of the reservoir. To facilitate melting of the solid material, there are heat transfer fins 45 and 46 which slope forwardly between the bottom wall 35 and the side walls 31, 32.

In addition to the opening 40 in the top wall 30 of the reservoir, there is a circular opening 47 near the front which is adapted to receive an end cap 48 of the pneumatic motor 15. This circular opening 47 is machined into the top wall by a drill which may be stepped so as to also bore a smaller diameter hole 49 in the bottom wall. If the two holes 47, 49 are drilled by a single stepped tool, concentricity is assured and consequently a barrel 50 of the pump 16 mounted in the bore 49 is concentrically mounted relative to the motor cylinder 55 which is located from and supported in the bore 47.

PNEUMATIC MOTOR

The pneumatic motor 15 comprises the cylinder 55 within which a piston 56 is slideable. A piston rod 57 extends downwardly from the piston 56 through the end cap 48 of the cylinder and the aperture 47 of the reservoir. This piston rod 57 terminates in a piston 58 which is received within the barrel or sleeve 50. Together, the piston 56 and sleeve 50 function as a pump, as is explained more fully hereinafter.

The cylinder 55 comprises the lower end cap 48, a sleeve 54 and an upper ported end cap 53. The two end caps 48, 53 and the sleeve 54 are held in an assembled relationship by four corner bolts 59 which extend for the length of the cylinder and are threaded into the top wall 30 of the reservoir. There is a flat top surface 60 on the cap 53 which serves as a seat for the interlock valve 24. This latter valve is bolted to the top cap 58 by bolts 61 which extend through the housing 62 of the valve 24 and are threaded into the top of the cap 53.

The lower end cap 48 functions as a packing gland and heat insulator between the cylinder 55 and the top wall 30 of the reservoir. It has a stepped axial bore 63 extending through it to provide a shoulder 52 which seats a metal annular lip seal or ring 64. In addition to functioning as a seal, the annular ring 64 also functions as a scraper to prevent molten material from adhering to the rod 57 and collecting in the chamber 75. A snap ring 65 retains the ring seal 64 on the seat 52 of the stepped bore 63. At the lower end the cap 48 terminates in a hub section 66 which fits within the bore 47 of the reservoir and locates the cylinder 55 on the reservoir 14. The upper end of this cap 48 also terminates in a hub section 67 over which there is fitted a compression spring 70. The top of this spring 70 is received over a hub section 71 of the piston 56. This spring 70 functions as a return spring to bias the piston 56 upwardly into the position illustrated in FIG. 3.

The piston 56 is made in two sections 72, 73 between which there is sandwiched a flexible cup seal 74. This seal precludes air pressure from leaking past the piston into the lower chamber 75 of the cylinder while still permitting some limited lateral movement of the piston relative to the cylinder. Similarly, clearance between the periphery of metal lip seal 64 and the shoulder of the cap within which it is seated permits some limited lateral movement of seal ring 64 and the piston rod so that close tolerances need not be maintained between the cylinder and the reservoir in order to have the piston rod 57 aligned with the bore of the sleeve 50. To further minimize the criticality of tolerances between these two components, the several thousandths of clearance is provided between the pistons 58 and sleeve 50. This minimization of critical tolerances reduces the total cost of the machine without in any way inpairing its operation or sacrificing quality of the resulting product.

In order to prevent contamination of the motor chamber 75 by fumes and gases evolved from the molten material 11 and consequent collection of the gaseous parcipitates on the motor components, the lower end of the cylinder 54 is ported as indicated at 76. As a consequence of this porting, each stroke of the piston causes the air contained in the lower chamber 75 to be expelled and ambient air to be subsequently drawn into the chamber. To minimize deterioration of the motor components, the end cap 48 is preferably manufactured from a heat insulative material.

Air at a preselected pressure (as for example, on the order of from 50–80 p.s.i.) is supplied to the top side of the piston 56 through a vertical passage 80 in the end cap 53 and an intersecting horizontal passage 81. This latter passage is threaded and receives a pipe threaded fitting 82 which interconnects the passageway 81 to the three-way solenoid-operated valve 23. This latter valve 23 serves to alternatively connect the passage 81 to either air at 50–80 p.s.i. or air at atmospheric pressure, depending upon the condition of the solenoid.

SLEEVE PUMP AND MANIFOLD

Molten material 11 is supplied to the gun 12 at a pressure of between 50 and 800 p.s.i., depending upon the material and the substrate to which it is applied. The piston pump which pressurizes the molten material to this extent comprises the piston 58 on the end of the piston rod 57 and the sleeve 50. This sleeve has four radial ports 85 which open into the bottom of the reservoir chamber 43. When the piston 58 is in the raised position illustrated in FIG. 3, molten material flows into the interior chamber 86 of the sleeve through the ports 85 so that upon subsequent downward movement of the piston 58, it causes a slug of molten material to be pushed through the outlet port 87 of the sleeve.

The sleeve 50 extends through the bottom wall of the reservoir 14 and has a lower flange 88 abutting against the bottom of the reservoir. When the manifold is secured onto the bottom of the reservoir by bolts 90, a stepped bore 91 of the manifold fits over the lower end of the sleeve 50 and a shoulder 92 of the bore 91 contacts the flange 88 of the sleeve to lock the flange 88 between the manifold and the bottom of the reservoir.

The vertical bore 91 of the manifold plate is intersected by a transverse bore 95. This latter bore is stepped and receives a threaded plug 96 in its outer end. The filter 18 which is bolted to the end of this plug is a so-called "hot melt" filter and extends into the transverse bore 95. A sealing ring 97 is supported about the periphery of the filter 18 so as to preclude any material from escaping through the outlet port 98 of the manifold plug except after having passed through the filter 18.

The so-called "hot melt" filter insures that the molten material which enters the gun 12 is free of particulate matter which might otherwise clog the small passages and orifices of the dispenser gun. Per se, the filter forms no part of the invention of this application. A complete description of a suitable filter may be found in U.S. Pat. No. 3,224,590, which patent is assigned to the assignee of this application.

DISPENSER GUN

Molten material is supplied from the outlet port 98 of the manifold 17 to the dispenser gun through the conduit 19. In the preferred embodiment the conduit 19 is heated so as to maintain the material in a molten state. A heated flexible hose which is particularly suited to this application is disclosed in U.S. Pat. No. 3,585,361, which patent is assigned to the assignee of this application.

The dispensing gun 12 is a conventional pneumatically actuated gun which is commercially available and per se forms no part of the invention of this application. One such suitable gun is disclosed in U.S. Pat. No. 3,570,725, which patent is also assigned to the assignee of this application.

Preferably, the gun 12 comprises a nozzle 100 having an outlet orifice 101 through which molten material may be dispensed from a pressurize chamber 102 under the control of a flow control valve 99 and differential hydraulic pressure. This valve is maintained in a closed position by a spring 103 and is opened as a consequence of air pressure being supplied to a pressure chamber 104 of the gun. A piston 105 secured to the valve 99 by a piston rod 106 causes the valve to open and permit flow from the chamber 102 as a consequence of air pressure being supplied to the chamber 104. A chamber 107 on the opposite side of the piston 105 from the chamber 104 is open to atmosphere through an orifice 108.

In the preferred embodiment the gun contains an electric heater 110 and a thermostat 111 which controls the supply of power to the heater 110. Air at an appropriate pressure to overcome the spring 103 hydraulic pressure in chamber 102 is supplied to the chamber 104 of the gun through a passage 112 and a conduit 113. The conduit 113 is in turn connected to an outlet port 114 of the interlock valve 24.

INTERLOCK VALVE

The function of the interlock valve is to insure that the flow control valve 99 of the dispenser gun 12 is always closed during the return stroke of the piston 56 of the pneumatic motor 15 and during the forward stroke of the piston until such time as the molten material in the pump reaches the desired outlet pressure. When this full pressure condition is reached, it is reflected as back pressure on the top side of the piston 56 and it is this back pressure in the top chamber 120 of the pneumatic motor 15 which is sensed and used to control opening and closing of the gun valve 99.

Figure 3A:
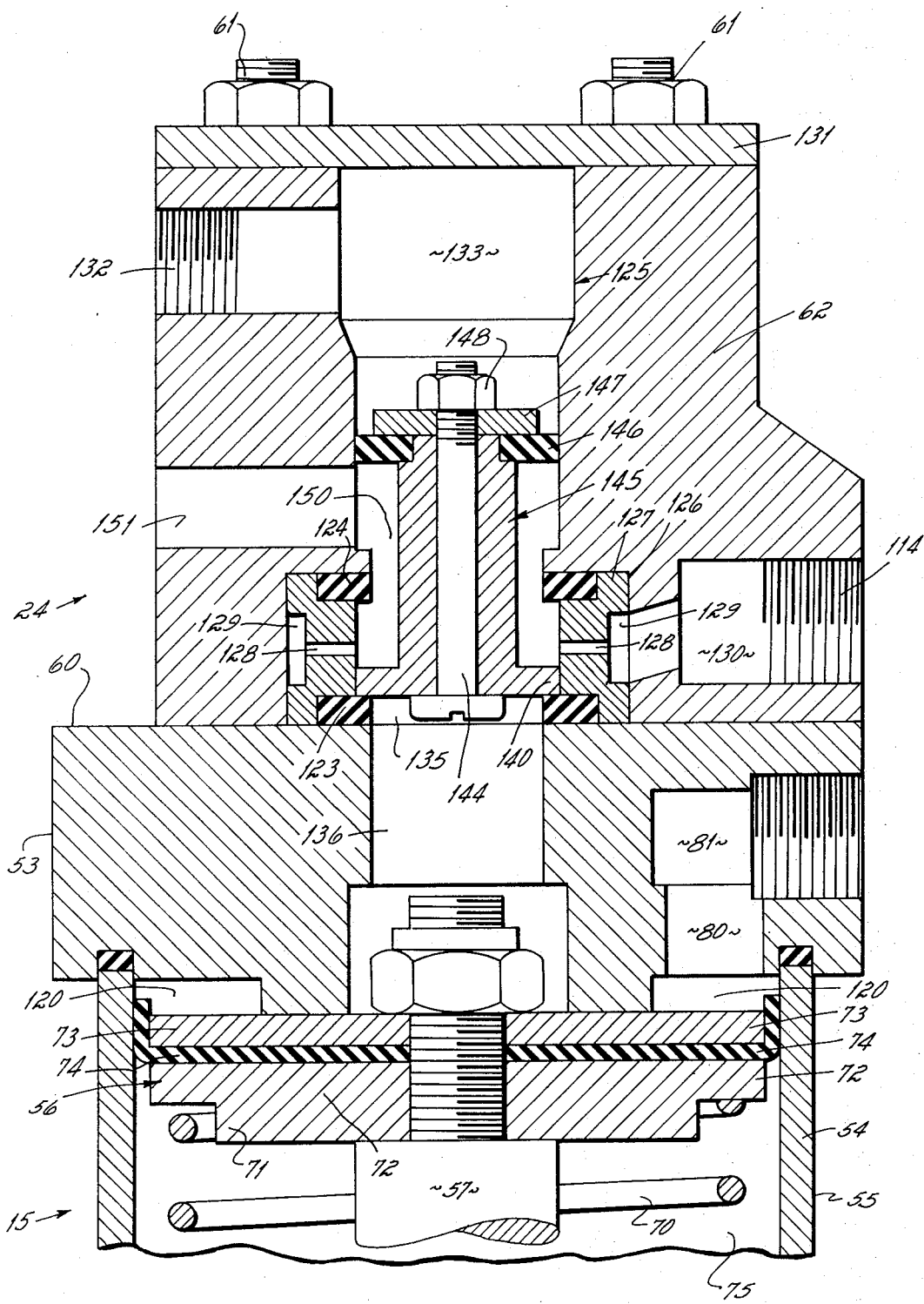
FIG. 3A is an enlarged cross sectional view of a portion of FIG. 3.

As best seen in FIG. 3A, the interlock valve 24 comprises the valve body 62 through which there extends an axial bore 125 which communicates with an axial bore 136 of the end cap 53. This bore has a counterbored lower end section 126 within which there is mounted a valve sleeve 127. The sleeve has a pair of orifices 128 which extend from the interior to an annular land 129 around the exterior. This land in turn is in fluid communication with a gun supply port 130.

The axial bore 125 of the valve is closed at the top by a cap 131 which is secured to the top of the body 62 by bolts 61 which extend through the body 62 and are threaded into the end cap 53 of the motor.

There is a port 132 in the upper part of the valve body which connects the upper end chamber 133 of the valve to the source of air pressure 20 via the regulator-filter and air conduit 134. The lower end chamber 135 of the valve is connected to the pressure chamber 120 of the pneumatic motor via the axial passage 136 in the top cap 53 of the air motor.

Slideably mounted within the through bore 125 of the valve, there is a spool 145 which has differential areas at its opposite ends. The lower end of this spool is of larger area than the upper end. It is defined by a flange 140 which is slideable within the sleeve 127 between a lower position in which it is located in sealing contact with a compressable shoulder 123 on one side of the orifice 128 to an upper position in which it is located in sealing contact with a compressable shoulder 124 on the opposite side of the orifice 128. The width of the flange 140 is greater than the diameter of the orifice 128 so that between the two positions into which it is movable it crosses and completely covers the orifice 128.

The upper smaller diameter end section of the spool 145 is defined by a flexible resilient seal 146. This seal is secured to the end of the spool by a washer 147 and a nut 148 which is threaded onto a bolt 144. Between the two end areas of the spool, there is a land 150 which is always open to atmosphere through an exhaust port 151 in the valve body.

In operation, the valve functions to connect the motor chamber 104 of the gun 12 to the source of regulated air pressure only when the pressure of molten material in the pump chamber 86 is at a predetermined value. At that time air pressure entering into the upper chamber 120 of the air motor 15 causes the force generated by the pressure in the chamber 135 acting on the valve to increase to a value where it nears or exceeds the force acting on the valve in the chamber 125. At that time the valve spool moves upwardly and in so doing the flange 140 passes over the orifices 128 into contact with seal 124 and opens those orifices 128 to the pressure contained in the chamber 135. Air pressure is then transmitted from the passage 81 through the chamber 120 of the air motor, the passage 136 of the cap 53, the orifices 128, through the conduit 113 to the pressure chamber 104 of the dispensing gun. The valve 99 of the gun then opens to allow pressurized molten material to pass from the chamber 102 through the orifice 101 and onto a substrate. When the solenoid valve 23 is subsequently actuated so as to connect the passage 81 to exhaust or atmospheric pressure, the force of the pressure in the chamber 135 is lowered and the higher air pressure force in upper chamber 125 causes the spool 145 to snap downwardly and engage seal 123, thereby connecting the chamber 104 of the gun to exhaust through the conduit 113, the orifice 128, the land 150 of the spool, and the exhaust port 151 of the valve, thus allowing the gun to close without waiting for the pressure in the chamber 135 to decay.

HOUSING

The melting temperature of many thermoplastic materials of the so-called "hot melt" type is in excess of 300°. Consequently, the reservoir 14 must be isolated to prevent the escape of heat from the reservoir and to protect operators from contact with it. To that end, as shown in FIGS. 1 and 2, the two side walls 31, 32 and the two end walls 33, 34 of the reservoir are encased in an insulative packing 160. This packing is in turn surrounded by the sheet metal housing 42.

The bottom of the reservoir 14 is spaced from a base 161 of the housing 42 by heat insulation spacers 163 which surround bolts 164. These bolts extend through the spacers and are threaded into the bottom of the reservoir. The heat insulative spacers 163 insure the maintenance of an air gap between the base mounting bracket 161 and the bottom of the reservoir.

One end of the housing 42 encloses a control area 170 within which all of the electrical controls of the machine are housed. Since these controls form no part of the invention of this application, they have not been illustrated or described in detail. Generally, though, these controls function to control the flow of electrical power to the heater 36 of the reservoir as well as the heater 110 of the gun and the heating element of the conduit 19. To that end the electrical contacts 165 and 166 of the heating element 36 extend into the control area 170 of the housing through the insulative packing 160 and a divider wall 167 of the housing which separates the heated section from the control section.

OPERATION

In operation solid powders or pellets or chunks of thermoplastic material are placed in the reservoir 14 through the open lid 41. Electrical power to the machine is then turned on and the machine allowed to heat up a temperature and for a time sufficient to convert the solid thermoplastic material in the reservoir to a molten state.

An electric control circuit is then actuated so as to cause energization of the electrical solenoid 23S of the valve 23. This control circuit forms no part of the invention of this application and therefore has not been illustrated in detail. One suitable control circuit is disclosed in pending U.S. Patent Application Ser. No. 194,862 of Robert G. Baker et al. for "Thermoplastic Dispenser System," which application is assigned to the assignee of this application. The control circuit there disclosed operates upon the principal of having a workpiece, as for example, a flap of a carton, contacting and closing a control switch, which switch then energizes the pump control solenoid 23S. Assuming that the control circuit is utilized for controlling the solenoid 23S, the flap control switch is first manually energized for a sufficient number of strokes of the piston pump so as to pressurize the molten material contained in the pump sleeve chamber 86, the conduit 19 and the dispensing gun chamber 102.

Upon energization of the solenoid of valve 23, the main air pressure source 20 is connected through the filter 21 and regulator 22 to the inlet port 80 of the pneumatic motor 15 through appropriate porting of the valve 23. Whenever the air pressure source 20 is connected to the regulator 22, air at the regulated pressure is supplied via line 134 to the chamber 125 of the interlock valve 24.

When air pressure is supplied to the port 80, the piston 56 of motor 15 is caused to move downwardly until either the back pressure of the molten material contained in the pump sleeve 86 arrests downward movement of the piston or a stop 83 on the piston rod bottoms out against the top surface of the cap 48. During this downward movement of the piston 56, the spool 145 of the valve 24 remains in the lower position against seal 123 illustrated in FIG. 3 of the drawings. The force required to compress the spring 70 is so selected that the pressure in the chamber 120 does not reach 80 percent of the pressure in chamber 125 until the downward movement of the piston 56 is terminated by the back pressure of the molten material in the chamber 86, reaching the preset application pressure of the material.

Figure 4:
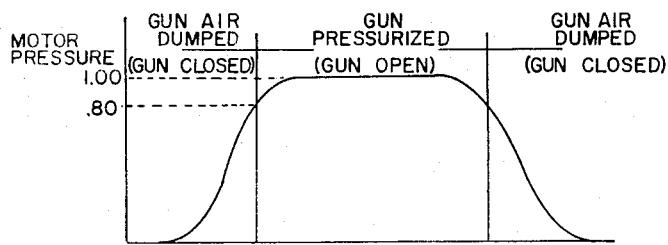
FIG. 4 is a chart illustrating the relationship between the pressure required to actuate the dispensing gun and to actuate the pneumatic pump of the machine.

When this back pressure in chamber 86 is reached (as illustrated graphically in FIG. 4), it causes the pneumatic pressure in the chamber 120 and consequently in the connected chamber 136 to increase to 80 percent of regulated air pressure. The spool 145 then moves upwardly from the lower position depicted in FIG. 3 to its uppermost position into engagement with seal 124 and in so doing the flange 140 of the spool crosses over the orifice 128, thereby connecting the chamber 136 to the pneumatic line 113 and to the chamber 104 of the dispenser gun. The valve 24 then causes the valve 99 of the gun to open and dispense the molten material from the chamber 102 onto a substrate.

In the preferred embodiment the substrate, as for example, the flap of a carton of container, actuates the switch which controls the solenoid 23S. When the flap disengages the switch, the solenoid 23S is de-energized, thereby connecting the inlet port 80 of the motor 15 to atmospheric pressure through the valve 23. When this occurs, the pressure chamber 120 is immediately lowered to a value less than 80 percent of regulated air pressure and the spool 145 of the valve 24 immediately snaps downwardly to disconnect the chamber 104 of the dispensing gun motor 25 from the pressure in chamber 120 of the pneumatic motor 15 and quickly dumps the air pressure in chamber 104 to atmosphere through port 151. The force of spring 70 then forces the piston 56 upwardly to the position depicted in FIG. 3 while air is exhausted from the chamber 120 through the inlet port 80 and the solenoid valve 23. When the switch which controls energization of the solenoid 23S is again energized, this cycle is repeated.

The primary advantage of the dispensing system described hereinabove resides in the fact that it has a minimal number of parts subject to wear and failure and that it may be inexpensively manufactured in relation to comparable systems now being used for application of thermoplastic material. To that end, the system utilizes no check valves in the pump and consequently has no check valve subject to wear or even becoming clogged. It will also be noted that the reciprocable air motor used to actuate the pump avoids the use of conventional overcenter and connecting valves links for causing reciprocation of the motor and that it, too, is therefore much less subject to failure than the types of motors which use such linkages and valving arrangements.

Another advantage of the machine 10 resides in the lack of criticality of alignment between the motor 15 and the pump 16. The piston 56 and piston rod 57 are capable of some self-centering movement because of their being supported in the cylinder by the flexible cup seal 74 and the lip seal 64.

Another advantage of this invention resides in the use of the interlock valve 24 which absolutely prevents the valve 99 of the dispensing gun 12 from being opened except when the molten material supplied to the gun is at predetermined or preset value. Only when that value is reached, does the interlock valve permit gun actuating air pressure to be applied to the control motor of the gun.

Another advantage of the use of the interlock valve 24 is that it insures that the pump piston 58 never initiates a recharging cycle until the valve 99 is closed. Consequently, as the piston 58 moves upwardly, there is a vacuum created in chamber 86. This vacuum then assists a viscous thermoplastic material to enter the ports 85 and the chamber 86 preparatory to being pressurized by downward movement of the piston 58. The vacuum thereby reduces the time required for the viscous material to flow into the chamber 86 and minimizes the recycle time of the pump.

While we have described only one preferred embodiment of this invention, persons skilled in the art to which it pertains will appreciate a number of changes and modifications which may be made without departing from the spirit of the invention. Therefore, we do not intend to be limited except by the scope of the appended claims.

Having described our invention, we claim:

1. A system for dispensing molten thermoplastic material comprising
    a heated reservoir for holding and maintaining said material in a molten state, said reservoir having bottom, side and top walls,
    a cylinder secured to one of said walls of said reservoir and having an axial bore therein,
    a motor piston movable within said cylinder bore and having a piston rod projecting into said reservoir,
    a pump barrel mounted upon a wall of said reservoir, said barrel having an axial bore colinearly aligned with the bore of said cylinder, said barrel having an inlet port, an outlet port, and one open end, said inlet port being located between said one open end of said barrel and said outlet port,
    a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet,
    a dispenser gun including a gun inlet port, a flow control valve, and a gun outlet orifice,
    conduit means connecting the inlet port of said gun to the outlet port of said barrel, and
    pressure responsive interlock valve means for preventing opening of said gun flow control valve except when the pressure of molten material in said barrel is above a preset minimum.

2. The dispensing system of claim 1 in which there is a flexible seal between said motor piston and said cylinder and a lip seal between said piston rod and said cylinder so that the flexibility of said flexible said compensates for misalignment between said pump piston and said barrel bore.

3. The dispensing system of claim 2 in which said flexible seal is a cup-type seal and said lip seal is a metal ring lip seal.

4. The dispensing system of claim 1 in which said barrel is mounted in a wall of said reservoir opposite said one wall upon which said cylinder is secured.

5. The dispensing system of claim 4 in which said cylinder is mounted upon said top wall of said reservoir and said barrel is mounted in said bottom wall.

6. The dispensing system of claim 1 in which one end of said cylinder is connected by a fluid line to a source of fluid pressure,
    spring means contained in the opposite end of said cylinder and operable to bias said motor piston toward said one end of said cylinder, and
    vent means in said opposite end of said cylinder operable to connect the interior of said opposite end of said cylinder to atmosphere so as to enable air at ambient temperature to be circulated through said opposite end of said cylinder during each stroke of said motor piston.

7. The dispensing system of claim 1 which further includes a fluid motor in said dispenser gun for effecting actuation of said gun flow control valve,
one end of said cylinder being connected by a fluid line to a source of fluid pressure, and
said interlock means comprising a pressure responsive valve means operable to connect said dispenser gun motor to said source of fluid pressure only when said fluid pressure in said one end of said cylinder is above a preset value.

8. The dispensing system of claim 7 in which said pressure responsive valve means comprises a two position differential pressure valve operable in one position to connect said dispenser gun motor to said source of fluid pressure and in the other position to connect said dispenser gun motor to atmospheric pressure.

9. The dispensing system of claim 8 in which said differential pressure valve comprises a spool movable within a valve body, said spool having one end of larger area than the other end, said one end of said spool being in fluid communication with said one end of said cylinder and said other end of said spool being in fluid communication with said source of fluid pressure.

10. A system for dispensing molten thermoplastic material comprising
a heated reservoir for holding and maintaining said material in a molten state, said reservoir having bottom, side and top walls,
a pneumatic motor including a cylinder secured to one of said walls of said reservoir and having an axial bore therein,
a motor piston movable within said cylinder bore and having a piston rod projecting into said reservoir,
a tubular pump barrel mounted upon a second wall opposite said one wall of said reservoir, said barrel having an axial bore colinearly aligned with the bore of said cylinder, said barrel having an inlet port, located in a side wall of said tubular barrel, an outlet port, and one open end, said inlet port being located between said one open end of said barrel and said outlet port,
a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet,
a flexible seal between said motor piston and said cylinder,
a lip seal between said piston rod and said cylinder so that the flexibility of said flexible seal compensates for misalignment between said pump piston and said barrel bore,
a dispenser gun including a gun inlet port, a flow control valve, and a gun outlet orifice, and
conduit means connecting the inlet port of said gun to the outlet port of said barrel.

11. The dispensing system of claim 10 in which said flexible seal is a cup-type seal and said lip seal is a metal ring lip seal.

12. The dispensing system of claim 10 in which said cylinder is mounted upon said top wall of said reservoir and said barrel is mounted in said bottom wall.

13. A system for dispensing molten thermoplastic material comprising
a heated reservoir for holding and maintaining said material in a molten state, said reservoir having bottom, side and top walls,
a pneumatic motor including a cylinder secured to one of said walls of said reservoir and having an axial bore therein,
a motor piston movable within said cylinder bore and having a piston rod projecting into said reservoir,
a fluid line connecting one end of said cylinder to a source of air pressure,
spring means contained in the opposite end of said cylinder and operable to bias said motor piston toward said one end of said cylinder,
vent means in said opposite end of said cylinder operable to connect the interior of said opposite end of said cylinder to atmosphere so as to enable air at ambient temperature to be circulated through said opposite end of said cylinder during each stroke of said motor piston,
a tubular barrel mounted upon a wall of said reservoir, said barrel having an axial bore colinearly aligned with the bore of said cylinder, said barrel having an inlet port, located in a side wall of said tubular barrel, an outlet port, and one open end, said inlet port being located between said one open end of said barrel and said outlet port,
a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet,
a dispenser gun including a gun inlet port, a flow control valve, and a gun inlet orifice, and
conduit means connecting the inlet port of said gun to the outlet port of said barrel.

14. A system for dispensing molten thermoplastic material comprising
a heated reservoir for holding and maintaining said material in a molten state, said reservoir having a bottom, side and top walls,
a cylinder secured to one of said walls of said reservoir and having an axial bore therein,
a motor piston movable within said cylinder bore and having a piston rod projecting into said reservoir,
a pump secured to said motor piston rod, said pump having an outlet port, said pump being operable upon reciprocation of said motor piston to eject molten material from said reservoir through said pump outlet port.
a dispenser gun including a gun inlet port, a flow control valve, and a gun outlet orifice,
conduit means connecting the inlet port of said gun to the outlet port of said pump, and
pressure responsive interlock valve means for preventing opening of said gun flow control valve except when the pressure of molten material in said pump outlet port is above a preset minimum.

15. The dispensing system of claim 14 which further includes a fluid motor in said dispenser gun for effecting actuation of said gun flow control valve,
one end of said cylinder being connected by a fluid line to a source of fluid pressure, and
said interlock means comprising a pressure responsive valve means operable to connect said dispenser gun motor to said source of fluid pressure only when said fluid pressure in said one end of said cylinder is above a preset value.

16. The dispensing system of claim 15 in which said pressure responsive valve means comprises a two position differential pressure valve operable in one position to connect said dispenser gun motor to said source of fluid pressure and in the other position to connect said dispenser gun motor to atmospheric pressure.

17. The dispensing system of claim 16 in which said differential pressure valve comprises a spool movable within a valve body, said spool having one end of larger area than the other end, said one end of said spool being in fluid communication with said one end of said cylinder and said other end of said spool being in fluid communication with said source of fluid pressure.

18. A system for dispensing molten thermoplastic material comprising
a heated reservoir for holding and maintaining said material in a molten state, said reservoir having bottom, side and top walls,
a cylinder secured to one of said walls of said reservoir and having an axial bore therein,
a motor piston movable within said cylinder bore and having a piston rod projecting into said reservoir,
a source of pneumatic pressure,
means connecting one end of said cylinder to said source of pneumatic pressure,
a pump having an outlet port, at least a portion of said pump being secured to said motor piston rod so as to reciprocate with said motor piston, said pump being operable to eject molten material from said reservoir through said pump outlet port,
a dispenser gun including a gun inlet port, a flow control valve, and a gun outlet orifice,
conduit means connecting the inlet port of said gun to the outlet port of said barrel, and
pressure responsive interlock valve means for preventing opening of said gun flow control valve except when the pneumatic pressure at said one end of said cylinder is above a preset minimum.

19. A liquid dispensing system including a source of pneumatic pressure, a pneumatically actuated pump having a pneumatic pressure chamber operatively connected to said source of pneumatic pressure,
a dispenser gun having a gun inlet port, a flow control valve, a pneumatic motor for actuating said flow control valve, and a gun outlet orifice, and
pneumatic interlock means comprising a pressure responsive valve operable to connect said dispenser gun motor to said source of pneumatic pressure only when the pump back pressure causes the pneumatic pressure in said pump pressure chamber to rise above a preset value.

20. The dispensing system of claim 19 in which said pressure responsive valve comprises a two position differential pressure valve operable in one position to connect said dispenser gun motor to said source of pneumatic pressure and in the other position to connect said dispenser gun motor to atmospheric pressure.

21. The dispensing system of claim 20 in which said differential pressure valve comprises a differential area spool movable within a valve body, said spool having one end of larger area than the other end, said one end of said spool being in fluid communication with said pump pressure chamber and said other end of said spool being in fluid communication with said source of fluid pressure.

22. A pneumatic flow control valve for use in combination with a liquid dispensing system of the type which includes a source of pneumatic pressure, a pneumatically actuated pump having a pneumatic pressure chamber operatively connected to said source of pneumatic pressure, and a dispenser gun having a gun inlet port, a flow control valve, a pneumatic motor for actuating said flow control valve, and a gun outlet orifice, said flow control valve comprising a two position differential pressure spool having one end of larger area than the other end, said one larger area end of said spool being adapted to be connected in fluid communication with said pump pressure chamber and said other smaller area end of said spool being adapted to be connected in fluid communication with said source of fluid pressure, said spool being adapted in one position to connect said dispenser gun motor to said source of pneumatic pressure and in the other position to connect said dispenser gun motor to atmospheric pressure such that said dispenser gun motor is connected to said source of pneumatic pressure only when the pump back pressure causes the pneumatic pressure in said pump pressure chamber to rise above a preset value.

23. A machine for supplying molten thermoplastic material to a dispensing head, said machine comprising a heated reservoir for holding and maintaining said material in a molten state, said reservoir having bottom, side and top walls,
a pneumatic motor including a cylinder secured to one of said walls of said reservoir and having an axial bore therein,
a motor piston movable within said cylinder bore and having a piston rod projecting into said reservoir,
a tubular pump barrel mounted upon a second wall opposite said one wall of said reservoir, said barrel having an axial bore colinearly aligned with the bore of said cylinder, said barrel having an inlet port, located in a side wall of said barrel, an outlet port, and one open end, said inlet port being located between said one open end of said barrel and said outlet port,
a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet, a flexible seal between said motor piston and said cylinder, and a lip seal between said piston rod and said cylinder so that a flexibility of said flexible seal compensates for misalignment between said pump piston and said barrel bore.

24. The dispensing system of claim 23 in which said flexible seal is a cup-type seal.

25. The dispensing system of claim 24 in which said barrel is mounted in a wall of said reservoir opposite said one wall upon which said cylinder is secured.

26. The dispensing system of claim 25 in which said cylinder is mounted upon said top wall of said reservoir and said barrel is mounted in said bottom wall.

27. A machine for supplying molten thermoplastic material to a dispensing head, said machine comprising a heated reservoir for holding and maintaining said material in a molten state, said reservoir having bottom, side and top walls, a pneumatic motor cylinder secured to one of said walls of said reservoir and having an axial bore therein, a motor piston movable within said cylinder bore and having a piston rod projecting into said reservoir, a fluid line connecting one end of said cylinder to a source of fluid air pressure, spring means contained in the opposite end of said cylinder and operable to bias said motor piston toward said one end of said cylinder, vent means in said opposite end of said cylinder operable to connect the interior of said opposite end of said cylinder to atmosphere so as to enable air at ambient temperature to be circulated through said opposite end of said cylinder during each stroke of said motor piston, a tubular barrel mounted upon a wall of said reservoir, said barrel having an axial bore colinearly aligned with the bore of said cylinder, said barrel having an inlet port located in a side wall of said reservoir, an outlet port, and one open end, said inlet port being located between said one open end of said barrel and said outlet port, and a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet.

28. A system for dispensing molten thermoplastic material comprising a heated reservoir for holding and maintaining said material in a molten state, said reservoir having a bottom wall, side and top walls, a heater mounted in said bottom wall of said reservoir, a cylinder secured to said top wall of said reservoir and having an axial bore therein, a motor piston movable within said cylinder bore and having a piston rod projecting into said reservoir, a fluid line connecting one end of said cylinder to a source of fluid pressure, spring means contained in the opposite end of said cylinder and operable to bias said motor piston toward said one end of said cylinder, vent means in said opposite end of said cylinder operable to connect the interior of said opposite end of said cylinder to atmosphere to as to enable air at ambient temperature to be circulated through said opposite end of said cylinder during each stroke of said motor piston, a barrel mounted in said bottom wall of said reservoir, said barrel having an axial bore colinearly aligned with the bore of said cylinder, said barrel having an inlet port, an outlet port, and one open end, said inlet port being located between said one open end of said barrel and said outlet port, a pump piston secured to said motor piston rod and mounted to reciprocate in the bore of said barrel, said pump piston being operable when moved rearwardly in said barrel to uncover said inlet port so as to enable a charge of molten material to be received into said barrel through said inlet port, said pump piston being operable when moved forwardly to cover said inlet port and force the material contained in said barrel forwardly through said barrel outlet, and said heater being disposed on at least two sides of said barrel.

29. The dispensing system of claim 28 in which said heater is mounted in said bottom wall of said reservoir in such a manner that heat is transferred from said heater through said bottom wall of said reservoir to said barrel.

30. The dispensing system of claim 29 in which said barrel protrudes through said bottom wall of said reservoir.

* * * * *